United States Patent
Delporte et al.

(10) Patent No.: US 10,883,825 B2
(45) Date of Patent: Jan. 5, 2021

(54) METHOD AND DEVICE FOR DETERMINING A BACKUP ALTITUDE OF AN AIRCRAFT

(71) Applicant: Airbus Operations SAS, Toulouse (FR)

(72) Inventors: Martin Delporte, Fonsorbes (FR); Guillaume Alcalay, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 197 days.

(21) Appl. No.: 16/148,511

(22) Filed: Oct. 1, 2018

(65) Prior Publication Data
US 2019/0107393 A1  Apr. 11, 2019

(30) Foreign Application Priority Data
Oct. 5, 2017 (FR) ...................... 17 59343

(51) Int. Cl.
| | |
|---|---|
| *G01C 5/06* | (2006.01) |
| *G01L 7/12* | (2006.01) |
| *G01C 5/00* | (2006.01) |
| *G01C 21/00* | (2006.01) |
| *G05D 1/04* | (2006.01) |

(Continued)

(52) U.S. Cl.
CPC ............ *G01C 5/06* (2013.01); *G01C 23/00* (2013.01); *G05D 1/0055* (2013.01); *G05D 1/042* (2013.01); *G01C 5/005* (2013.01)

(58) Field of Classification Search
CPC .. G01C 5/06; G01C 21/00; G01C 5/00; G01L 7/12; G06F 9/45; G06F 17/10; G01P 15/13; G01S 13/08
See application file for complete search history.

(56) References Cited

U.S. PATENT DOCUMENTS

| | | | | |
|---|---|---|---|---|
| 4,686,858 A | * | 8/1987 | Muscatell | ............ G01L 9/0039 356/450 |
| 6,216,064 B1 | | 4/2001 | Johnson et al. | |
| | | (Continued) | | |

FOREIGN PATENT DOCUMENTS

| | | | |
|---|---|---|---|
| JP | 2016217759 A | 12/2016 | |
| RU | 2015-122101 * | 2/2015 | ............ G01C 21/00 |
| WO | 9942788 A1 | 8/1999 | |

OTHER PUBLICATIONS

French Search Report; priority document.

*Primary Examiner* — Yuri Kan
(74) *Attorney, Agent, or Firm* — Greer, Burns & Crain, Ltd.

(57) ABSTRACT

A determining method comprises a first computing step implemented by a computational module to compute a static pressure from an altitude determined by a geolocation module, a receiving step implemented by a reception module to receive a static pressure determined by a static pressure sensor, a second computing step implemented by a second computational module to compute a static pressure difference between the static pressure and the static pressure, a step of filtering the static pressure difference, a third computing step implemented by a third computational module in order to compute the backup altitude from the filtered static pressure difference and from the static pressure, and a sending step implemented by a sending module in order to deliver the computed backup altitude to a user device.

13 Claims, 3 Drawing Sheets

(51) Int. Cl.
*G01C 23/00* (2006.01)
*G05D 1/00* (2006.01)

(56) References Cited

U.S. PATENT DOCUMENTS

| | | | |
|---|---|---|---|
| 6,456,940 B1 | 9/2002 | Higgins et al. | |
| 6,584,839 B1* | 7/2003 | Hedrick | G01C 5/005 |
| | | | 702/138 |
| 6,662,652 B1* | 12/2003 | Ferrero | G01L 7/12 |
| | | | 73/387 |
| 6,804,614 B1 | 10/2004 | McGraw et al. | |
| 7,415,396 B2* | 8/2008 | D'Ouince | G01D 3/08 |
| | | | 700/52 |
| 7,429,948 B2* | 9/2008 | Burgett | G01C 5/06 |
| | | | 342/118 |
| 2005/0010389 A1* | 1/2005 | D'Ouince | G05B 9/03 |
| | | | 703/22 |
| 2007/0043482 A1 | 2/2007 | Aimar | |
| 2007/0290091 A1 | 12/2007 | Carpenter | |
| 2013/0190951 A1 | 7/2013 | Block et al. | |

* cited by examiner

METHOD AND DEVICE FOR DETERMINING A BACKUP ALTITUDE OF AN AIRCRAFT

CROSS-REFERENCES TO RELATED APPLICATIONS

This application claims the benefit of the French patent application No. 1759343 filed on Oct. 5, 2017, the entire disclosures of which are incorporated herein by way of reference.

BACKGROUND OF THE INVENTION

The present invention relates to a method and a device for determining a backup altitude of an aircraft.

The backup parameters, such as backup altitude, of an aircraft may be derived from corrected static pressure values originating from pressure sensors located in the nacelles of the engines of an aircraft. It appears that backup parameters derived in this way are consistent with the altitude determined by a conventional system for measuring pressure altitude, except during engine transients.

In order to improve at least the backup altitude, the static pressure values are combined with data originating from a geolocation system. This combination improves the values of backup altitudes during engine transients. However, the thrust of the motor next to which the pressure sensors of the aircraft are located has a significant effect on the static pressure, this causing the backup altitude to drift.

SUMMARY OF THE INVENTION

An objective of the present invention is to mitigate these drawbacks by providing a method and an on-board device allowing a backup altitude of an aircraft, in particular a cargo plane, to be determined.

Thus, the invention relates to a method for determining a backup altitude of an aircraft.

According to the invention, the determining method comprises the following steps, which are implemented repetitively and automatically:

a first computing step, implemented by a first computational module, comprising computing a first static pressure from an altitude determined by a geolocation module;

a receiving step, implemented by a reception module, comprising receiving a second static pressure determined by a static pressure sensor;

a second computing step, implemented by a second computational module, comprising computing a static pressure difference between the second static pressure and the first static pressure;

a filtering step, implemented by a filtering module, comprising filtering the static pressure difference;

a third computing step, implemented by a third computational module, comprising computing the backup altitude from the static pressure difference filtered in the filtering step and from the first static pressure computed in the first computing step;

a sending step, implemented by a sending module, comprising delivering the computed backup altitude to a user device.

Thus, because the backup altitude is computed from static pressures, air data references (ADRs) are not required to determine the backup altitude. The variations in backup altitude during engine transients are therefore smaller.

According to one particularity, the first computing step comprises the following substeps:

a first receiving substep, implemented by a first reception submodule, comprising receiving the altitude determined by the geolocation module;

a first computing substep, implemented by a first computational submodule, comprising computing the first static pressure from the altitude received in the receiving substep and from a standard atmospheric model that defines a static pressure as a function of an altitude.

Advantageously, the filtering step comprises the following substeps:

a second receiving substep, implemented by a second reception submodule, comprising receiving a vertical speed of the aircraft, the speed being determined by the geolocation module;

a second computing substep, implemented by a second computational submodule, comprising computing the variable time constant from the absolute value of the vertical speed of the aircraft and from an interpolation table that defines a time constant as a function of a vertical speed of the aircraft;

a filtering substep, implemented by a filtering submodule, comprising filtering the static pressure difference depending on the variable time constant.

Thus, the filtering step allows the fact that the layers of the atmosphere are offset with respect to the layers of the standard atmospheric model to be taken into account.

Furthermore, the filtering step comprises an initialization substep, implemented by an initialization submodule, comprising carrying out an initialization of the filtering submodule if a set of predetermined conditions is met.

For example, the initialization comprises:

assigning an actual static pressure value to the second static pressure, assigning to the output of the filtering module the value corresponding to a value input into the filtering module.

Nonlimitingly, the set of conditions comprises:

the speed of the aircraft is lower than a predetermined speed;

the initialization has not been carried out for the flight in progress or must be carried out again.

Moreover, the third computing step comprises the following substeps:

a third computing substep, implemented by a third computational submodule, comprising computing a hybridized static pressure by computing the sum of the static pressure difference and the first static pressure;

a fourth computing substep, implemented by a fourth computational submodule, comprising computing the backup altitude from the hybridized static pressure and from a standard atmospheric model.

The invention also relates to a device for determining a backup altitude of an aircraft.

According to the invention, the determining device comprises the following modules:

a first computational module configured to compute a first static pressure from an altitude determined by a geolocation module;

a reception module configured to receive a second static pressure determined by a static pressure sensor;

a second computational module configured to compute a static pressure difference between the second static pressure and the first static pressure;

a filtering module configured to filter the static pressure difference;

a third computational module configured to compute the backup altitude from the static pressure difference filtered by the filtering module and from the first static pressure computed by the first computational module;

a sending module configured to deliver the computed backup altitude to a user device.

According to one particularity, the first computational module comprises the following submodules:

a first reception submodule configured to receive the altitude determined by the geolocation module;

a first computational submodule configured to compute the first static pressure from the altitude received by the reception submodule and from a standard atmospheric model that defines a static pressure as a function of an altitude.

Advantageously, the filtering module comprises the following submodules:

a second reception submodule configured to receive a vertical speed of the aircraft, the speed being determined by the geolocation module;

a second computational submodule configured to compute the variable time constant from the absolute value of the vertical speed of the aircraft and from an interpolation table that defines a time constant as a function of a vertical speed of the aircraft;

a filtering submodule configured to filter the static pressure difference depending on the variable time constant.

Furthermore, the filtering module comprises an initialization submodule that is configured to carry out an initialization of the filtering submodule if a set of predetermined conditions is met.

Moreover, the third computational module comprises the following submodules:

a third computational submodule configured to compute a hybridized static pressure by computing the sum of the static pressure difference and the first static pressure;

a fourth computational submodule configured to compute the backup altitude from the hybridized static pressure and from a standard atmospheric model.

The invention also relates to an aircraft, in particular a cargo plane, including a device for determining a backup altitude of the aircraft, such as described above.

BRIEF DESCRIPTION OF THE DRAWINGS

The invention, with its features and advantages, will become more clearly apparent on reading the description given with reference to the appended drawings, in which.

DETAILED DESCRIPTION OF THE PREFERRED EMBODIMENTS

Figure 1:
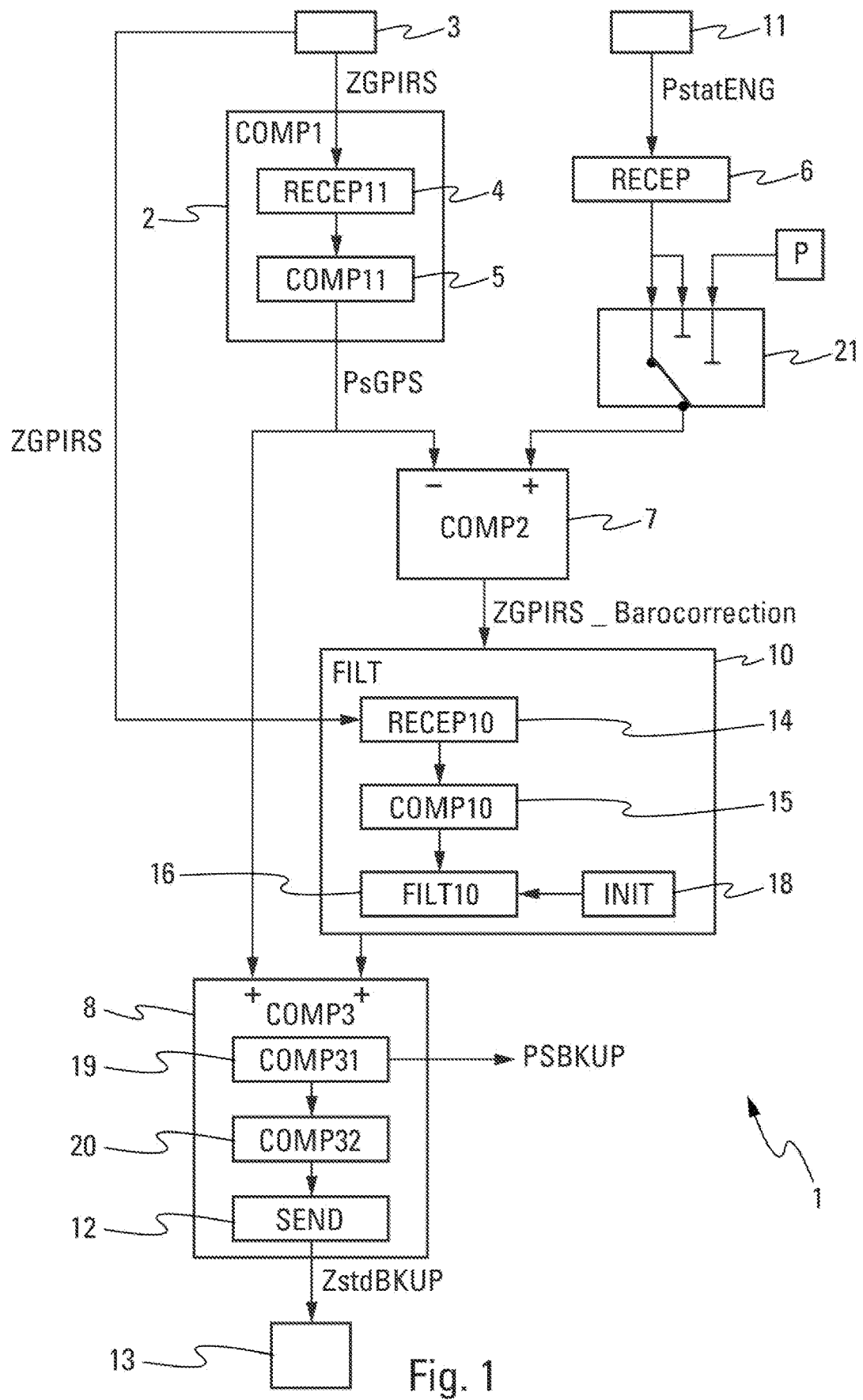
FIG. 1 schematically shows one embodiment of the determining device.

FIG. 1 shows one embodiment of the device for determining a backup altitude ZstdBKUP of an aircraft AC. In the rest of the description the "device for determining a backup altitude ZstdBKUP of an aircraft AC" is called the "determining device."

It may be contained in an on-board computer.

The determining device 1 is based on the fact that the pressure altitude and geometric altitude are offset with respect to each other. At the very least, they are offset with a difference that varies very slowly. This fact has been verified experimentally.

The difficulty arises from the fact that this offset varies when the aircraft AC leaves its flight level.

To resolve this difficulty, the determining device 1 comprises the following modules.

The determining device 1, which is on board the aircraft AC (FIG. 4), comprises, as shown in FIG. 1, a computational module COMP1 2, a computational module COMP2 7, a filtering module FILT 10, a computational module COMP3 8, a reception module RECEP 6, a filtering module FILT 10, and a sending module SEND 12.

The computational module 2 is configured to compute a static pressure PsGPS from a geometric altitude ZGPIRS determined by a geolocation module 3.

The geolocation module 3 may correspond to a global navigation satellite system. For example, the global navigation satellite system corresponds to a global positioning satellite system, for example of GPS type (GPS for Global Positioning System).

Advantageously, the computational module 2 comprises the following submodules:

a reception submodule RECEP11 4 configured to receive the geometric altitude ZGPIRS determined by the geolocation module 3;

a computational submodule COMP11 5 configured to compute the static pressure PsGPS from the geometric altitude ZGPIRS received by the reception submodule 4 and from a standard atmospheric model that defines a static pressure as a function of an altitude.

The standard atmospheric model may correspond to the international standard atmospheric model also called the ISA model (ISA for International Standard Atmosphere). This model describes the variations in pressure, in viscosity, in temperature, in density, etc., as a function of altitude. Other atmospheric models may be used. The computation of the first static pressure may be carried out by the computational submodule 5 using a formula defining a static pressure as a function of altitude based on the atmospheric model and/or using an interpolation table defining a static pressure as a function of altitude based on the atmospheric model.

The atmospheric model may be contained in a memory of the computational module 2.

The reception module 6 is configured to receive a static pressure PstatENG determined by a static pressure sensor 11. The static pressure sensor 11 may correspond to a sensor of an engine of the aircraft AC.

According to one embodiment, the determining device 1 may comprise a backup submodule 21 allowing a value P to be assigned by default to the second static pressure PstatENG, if the static pressure PstatENG determined by the static pressure sensor 11 does not have a coherent value. This default value P by default may be substantially equal to 1013 hPa.

The computational module 7 is configured to compute a static pressure difference ZGPIRS_Barocorrection between the static pressure PstatENG and the static pressure PsGPS.

This static pressure difference ZGPIRS_Barocorrection corresponds to a barometric correction allowing the static pressure PsGPS to be corrected.

The filtering module 10 is configured to filter the static pressure difference ZGPIRS_Barocorrection.

The computational module 8 is configured to compute the backup altitude ZstdBKUP from the static pressure difference ZGPIRS_Barocorrection filtered by the filtering module 10 and the static pressure PsGPS computed by the computational module 2.

Advantageously, the computational module 8 comprises the following submodules:

a computational submodule COMP31 19 configured to compute a hybridized static pressure PSBKUP by computing the sum of the static pressure difference ZGPIRS_Barocorrection filtered by the filtering module 10 and the static pressure PsGPS;

a computational submodule COMP32 20 configured to compute the backup altitude ZstdBKUP from the hybridized static pressure PSBKUP and from the standard atmospheric model.

This determining device 1 thus allows a backup altitude ZstdBKUP to be obtained without air data references or ADRs.

The sending module 12 is configured to deliver a signal representative of the computed backup altitude ZstdBKUP to a user device 13.

The user device 13 may correspond to a display system configured to display the backup altitude ZstdBKUP from the signal representative of the backup altitude delivered by the sending module.

Advantageously, the filtering module 10 comprises the following submodules:

a reception submodule RECEP10 14 configured to receive a vertical speed VZGPIRS of the aircraft AC, the speed being determined by the geolocation module 3;

a computational submodule COMP10 15 configured to compute the variable time constant TauHybrid from the absolute value |u| of the vertical speed VZGPIRS of the aircraft AC and from an interpolation table T that defines a time constant as a function of the absolute value of a vertical speed of the aircraft AC;

a filtering submodule FILT10 16 configured to filter the static pressure difference ZGPIRS_Barocorrection depending on the variable time constant TauHybrid.

The filtering module 10 allows an exact backup altitude ZstdBKUP to be obtained by taking into account the fact that the layers of the atmosphere are not exactly identical to those of the atmosphere modelled by the standard atmospheric model corrected by the barometric correction (the static pressure difference ZGPIRS_Barocorrection).

For example, the computational submodule 15 computes the variable time constant TauHybrid using an interpolation table T that relates the time constant to the absolute value |u| of the vertical speed VZGPIRS of the aircraft AC. The computational submodule 15 computes the absolute value |u| of the vertical speed VZGPIRS of the aircraft AC in order to compute the time constant TauHybrid using the interpolation table T.

In one nonlimiting example, the interpolation table T contains values chosen in the following way.

At a constant flight level, the barometric correction (the static pressure difference ZGPIRS_Barocorrection) is filtered using a very long time constant TauHybrid. In contrast, as soon as the flight level of the aircraft AC changes, on the basis of the vertical speed VZGPIRS of the aircraft AC, the barometric correction is synchronized more rapidly with the static pressure PstatENG; this meaning that the time constant TauHybrid is lower.

Thus, nonlimitingly, the interpolation table T contains the following values.

When the vertical speed of the aircraft AC has a vertical speed VZGPIRS of 100 feet/min (about 1.83 km/h), the time constant TauHybrid takes a value equal to 1000 s.

When the vertical speed of the aircraft AC has a vertical speed VZGPIRS of 5000 feet/min (about 91.44 km/h), the time constant TauHybrid takes a value equal to 3 s.

The filtering submodule 16 may correspond to a first-order filtering module. It may comprise at least one low-pass filter or one high-pass filter or any other filter suitable for filtering the barometric correction (static pressure difference ZGPIRS_Barocorrection). The filtering submodule 16 allows noise in the barometric correction to be filtered out. This filtering submodule 16 operates at a frequency that is the inverse (1/Tauhybrid) of the variable time constant TauHybrid.

Advantageously, the filtering module 10 furthermore comprises an initialization submodule INIT 18 configured to carry out an initialization of the filtering submodule 16 if a set of predetermined conditions is met.

For example, the initialization comprises:

assigning an actual static pressure value Pstat to the static pressure PstatENG,133134' assigning to the output of the filtering submodule 16 the value corresponding to a value input into the filtering submodule 16.

The set of conditions may comprise:

the speed of the aircraft AC is lower than a predetermined speed;

the initialization has not been carried out for the flight in progress or must be carried out again (reset of the on-board computer).

Nonlimitingly, the predetermined speed is substantially equal to 60 knots (about 111.12 km/h).

Figure 2:
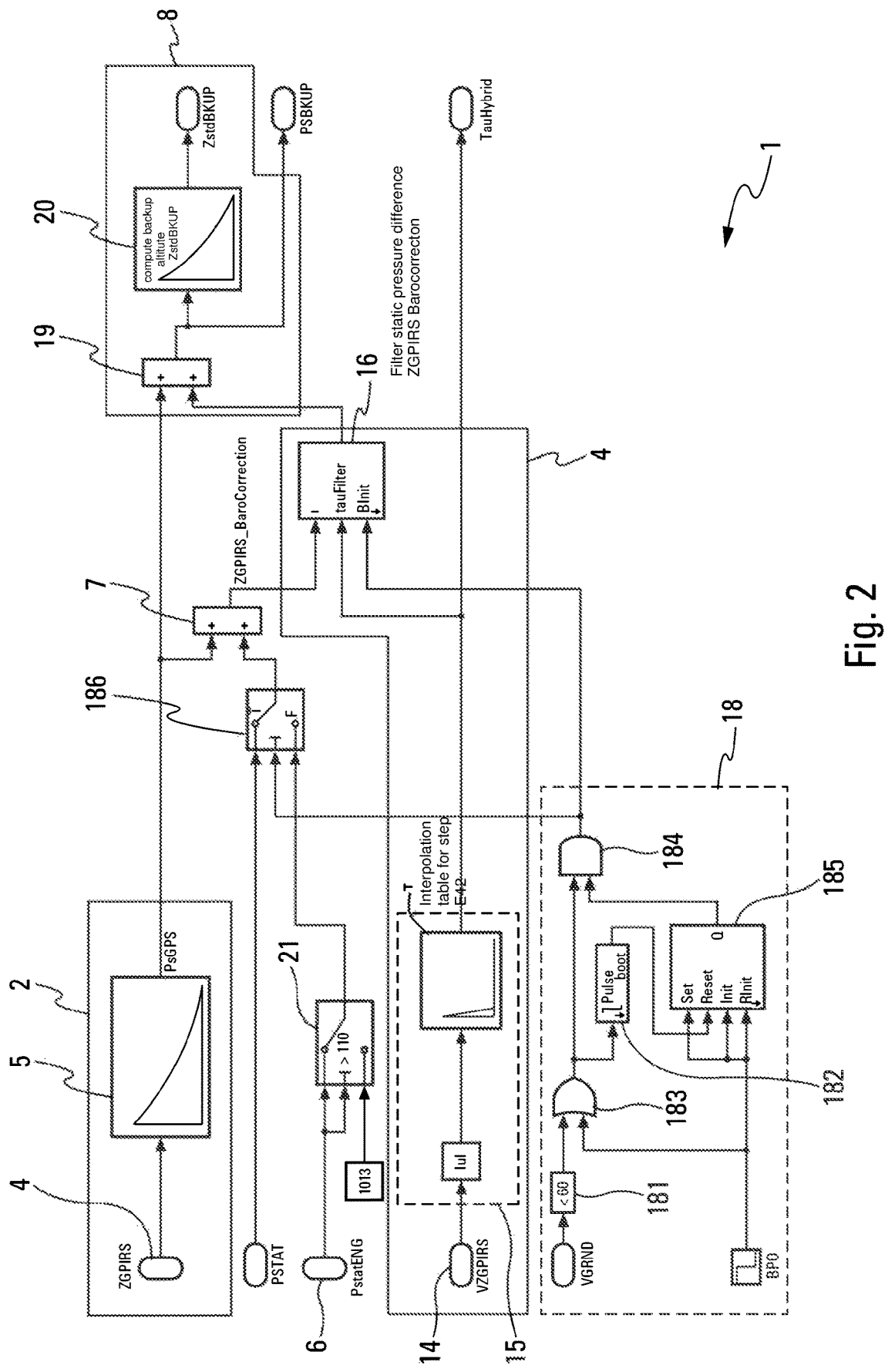
FIG. 2 shows one embodiment of the determining device.

FIG. 2 shows one embodiment of the determining device and, in particular, of the initialization module 18.

In this embodiment, the initialization module 18 has two inputs: a first input corresponding to a signal representative of the speed VGRND of the aircraft AC and a second input corresponding to a Boolean initialization signal BPO that passes to the "true" Boolean signal only during the first operating cycles of the method, for example, during the start-up of the on-board computer implementing the method or during a reset of the computer. A submodule 181 emits a "true" Boolean signal when the speed VGRND of the aircraft AC is lower than 60 knots and a "false" Boolean signal if this speed VGRND is above 60 knots. The initialization signal BPO and the signal of the submodule 181 are sent to the inputs of an OR gate 183 the output of which is connected to a first input of an AND gate 184 and to the input of a pulse module 182. The pulse module 182 emits a "false" Boolean signal if the output signal of the OR gate is "true" and a "true" Boolean signal if the output signal of the OR gate is "false."

In this embodiment, the initialization module comprises a flip-flop 185 having a set input, a reset input, two initialization inputs and an output Q. The initialization signal BPO is sent to the set input and to the two initialization inputs. The signal emitted by the pulse module 182 is sent to the reset input. The output Q is connected to the second input of the AND gate 184.

The output of the AND gate 184 is connected to a component 186. The output of the component 186 corresponds to the static pressure PstatENG determined by a static pressure sensor 11 if the output of the AND gate 184 emits a "false" Boolean signal and to the actual static pressure Pstat if the output of the AND gate 184 emits a "true" Boolean signal. The output of the component 186 is connected to the computational module 7. Thus, the computational module 7 is configured to compute a static pressure difference ZGPIRS_Barocorrection between the static pressure PstatENG and the static pressure PsGPS if the output of the AND gate 184 emits a "false" Boolean signal, or a static pressure difference ZGPIRS_Barocorrection between the actual static pressure Pstat and the static pressure PsGPS if the output of the AND gate 184 emits a "true" Boolean signal.

Figures 3, 4:
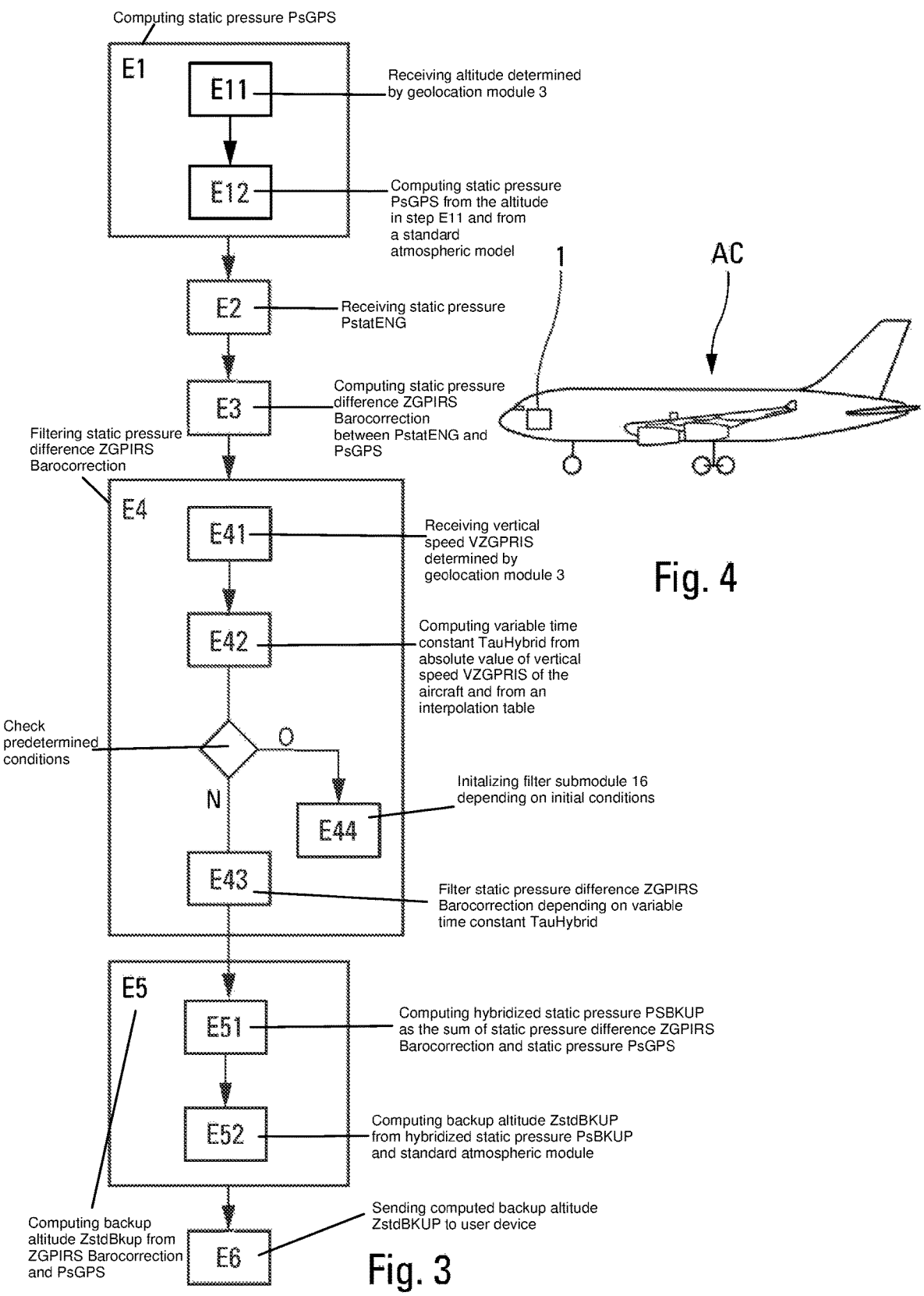
FIG. 3 schematically shows the steps of the determining method according to one embodiment.
FIG. 4 shows an aircraft carrying a determining device on board.

FIG. 3 shows one embodiment of the method for determining a backup altitude ZstdBKUP of an aircraft AC.

The determining method comprises the following steps, which are implemented repetitively and automatically:

a computing step E1, implemented by the computational module 2, comprising computing a static pressure PsGPS from an altitude determined by a geolocation module 3;

a receiving step E2, implemented by the reception module 6, comprising receiving a static pressure PstatENG determined by a static pressure sensor 11;

a computing step E3, implemented by the computational module 7, comprising computing a static pressure difference ZGPIRS_Barocorrection between the static pressure PstatENG and the static pressure PsGPS;

a filtering step E4, implemented by a filtering module 10, comprising filtering the static pressure difference ZGPIRS_Barocorrection;

a computing step E5, implemented by the computational module 8, comprising computing the backup altitude ZstdBKUP from the static pressure difference ZGPIR_Barocorrection filtered in the filtering step E4 and from the static pressure PsGPS computed in the computing step E1;

a sending step E6, implemented by the sending module 12, comprising delivering the computed backup altitude ZstdBKUP to a user device 13.

The computing step E1 may comprise the following substeps:

a receiving substep E11, implemented by the reception submodule 4, comprising receiving the altitude determined by the geolocation module 3;

a computing substep E12, implemented by the computational submodule 5, comprising computing the static pressure PsGPS from the altitude received in the receiving substep E11 and from a standard atmospheric model that defines a static pressure as a function of an altitude.

Advantageously, the filtering step E4 comprises the following substeps:

a receiving substep E41, implemented by the reception submodule 14, comprising receiving a vertical speed VZGPIRS of the aircraft AC, the speed being determined by the geolocation module 3;

a computing substep E42, implemented by the computational submodule 15, comprising computing the variable time constant TauHybrid from the absolute value |u| of the vertical speed VZGPIRS of the aircraft AC and from an interpolation table T that defines a time constant as a function of a vertical speed of the aircraft AC;

a filtering substep E43, implemented by the filtering submodule 16, comprising filtering the static pressure difference ZGPIRS_Barocorrection depending on the variable time constant TauHybrid.

Advantageously, the filtering step E4 furthermore comprises an initialization substep E44, implemented by the initialization submodule 18, comprising carrying out an initialization of the filtering submodule 16 if a set of predetermined conditions is met.

In FIG. 3, the branch O corresponds to the fact that the set of conditions is met. The branch N corresponds to the fact that the set of conditions is not met.

The computing step E5 comprises the following substeps:

a computing substep E51, implemented by the computational submodule 19, comprising computing a hybridized static pressure PSBKUP by computing the sum of the static pressure difference ZGPIRS_Barocorrection and the static pressure PsGPS;

a computing substep E52, implemented by the computational submodule 20, comprising computing the backup altitude ZstdBKUP from the hybridized static pressure PSBKUP and from the standard atmospheric model.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining a backup altitude of an aircraft, comprising the following steps:

a first computing step, implemented by a first computational module, comprising computing a first static pressure from an altitude determined by a geolocation module;

a receiving step, implemented by a reception module, comprising receiving a second static pressure determined by a static pressure sensor;

a second computing step, implemented by a second computational module, comprising computing a static pressure difference between the second static pressure and the first static pressure;

a filtering step, implemented by a filtering module, comprising filtering the static pressure difference;

a third computing step, implemented by a third computational module, comprising computing the backup altitude from the static pressure difference filtered in the filtering step and from the first static pressure computed in the first computing step;

a sending step, implemented by a sending module, comprising delivering the computed backup altitude to a user device; and a displaying step, comprising displaying computed backup altitude to a user.

2. The method according to claim 1, wherein the first computing step comprises the following substeps:

a first receiving substep, implemented by a first reception submodule, comprising receiving the altitude determined by the geolocation module;

a first computing substep, implemented by a first computational submodule, comprising computing the first static pressure from the altitude received in the receiving substep and from a standard atmospheric model that defines a static pressure as a function of an altitude.

3. The method according to claim 1, wherein the filtering step comprises the following substeps:

a second receiving substep, implemented by a second reception submodule, comprising receiving a vertical speed of the aircraft, said vertical speed being determined by the geolocation module;

a second computing substep, implemented by a second computational submodule, comprising computing a variable time constant from an absolute value of the vertical speed of the aircraft and from an interpolation table that defines a time constant as a function of the vertical speed of the aircraft;

a filtering substep, implemented by a filtering submodule, comprising filtering the static pressure difference depending on the variable time constant.

4. The method according to claim 3, wherein the filtering step furthermore comprises an initialization substep, implemented by an initialization submodule, comprising carrying out an initialization of the filtering submodule if a set of predetermined conditions is met.

5. The method according to claim 4, wherein the initialization comprises:

assigning an actual static pressure value to the second static pressure, assigning to an output of the filtering module a value corresponding to a value input into the filtering module.

6. The method according to claim 4, wherein the set of conditions comprises:

a speed of the aircraft is lower than a predetermined speed;

the initialization has not been carried out for a flight in progress or must be carried out again.

7. The method according to claim 1, wherein the third computing step comprises the following substeps:

a third computing substep, implemented by a third computational submodule, comprising computing a hybridized static pressure by computing a sum of the static pressure difference and the first static pressure;

a fourth computing substep, implemented by a fourth computational submodule, comprising computing the backup altitude from the hybridized static pressure and from a standard atmospheric model.

8. A device for determining a backup altitude of an aircraft, comprising the following modules:

a first computational module configured to compute a first static pressure from an altitude determined by a geolocation module;

a reception module configured to receive a second static pressure determined by a static pressure sensor;

a second computational module configured to compute a static pressure difference between the second static pressure and the first static pressure;

a filtering module configured to filter the static pressure difference;

a third computational module configured to compute the backup altitude from the static pressure difference filtered by the filtering module and from the first static pressure computed by the first computational module;

a sending module configured to deliver the computed backup altitude to a user device; and a displaying module configured to display computed backup altitude to a user.

9. The device according to claim 8, wherein the first computational module comprises the following submodules:

a first reception submodule configured to receive the altitude determined by the geolocation module;

a first computational submodule configured to compute the first static pressure from the altitude received by the first reception submodule and from a standard atmospheric model that defines a static pressure as a function of an altitude.

10. The device according to claim 8, wherein the filtering module comprises the following submodules:

a second reception submodule configured to receive a vertical speed of the aircraft, said vertical speed being determined by the geolocation module;

a second computational submodule configured to compute a variable time constant from an absolute value of the vertical speed of the aircraft and from an interpolation table that defines a time constant as a function of a vertical speed of the aircraft;

a filtering submodule configured to filter the static pressure difference depending on the variable time constant.

11. The device according to claim 10, wherein the filtering module furthermore comprises an initialization submodule that is configured to carry out an initialization of the filtering submodule if a set of predetermined conditions is met.

12. The device according to claim 8, wherein the third computational module comprises the following submodules:

a third computational submodule configured to compute a hybridized static pressure by computing a sum of the static pressure difference and the first static pressure;

a fourth computational submodule configured to compute the backup altitude from the hybridized static pressure and from a standard atmospheric model.

13. An aircraft comprising a device for determining a backup altitude of the aircraft, as specified in claim 8.

* * * * *